July 31, 1962 D. E. ALBRECHT 3,047,043
APPARATUS FOR APPLYING HOSE COUPLINGS TO HOSES
Filed Nov. 18, 1959 5 Sheets-Sheet 1

INVENTOR.
DAVID E. ALBRECHT
BY
ATTORNEYS

July 31, 1962 D. E. ALBRECHT 3,047,043
APPARATUS FOR APPLYING HOSE COUPLINGS TO HOSES
Filed Nov. 18, 1959 5 Sheets-Sheet 2

INVENTOR.
DAVID E. ALBRECHT
BY

ATTORNEYS

July 31, 1962   D. E. ALBRECHT   3,047,043
APPARATUS FOR APPLYING HOSE COUPLINGS TO HOSES
Filed Nov. 18, 1959   5 Sheets-Sheet 3

INVENTOR.
DAVID E. ALBRECHT
BY
ATTORNEYS

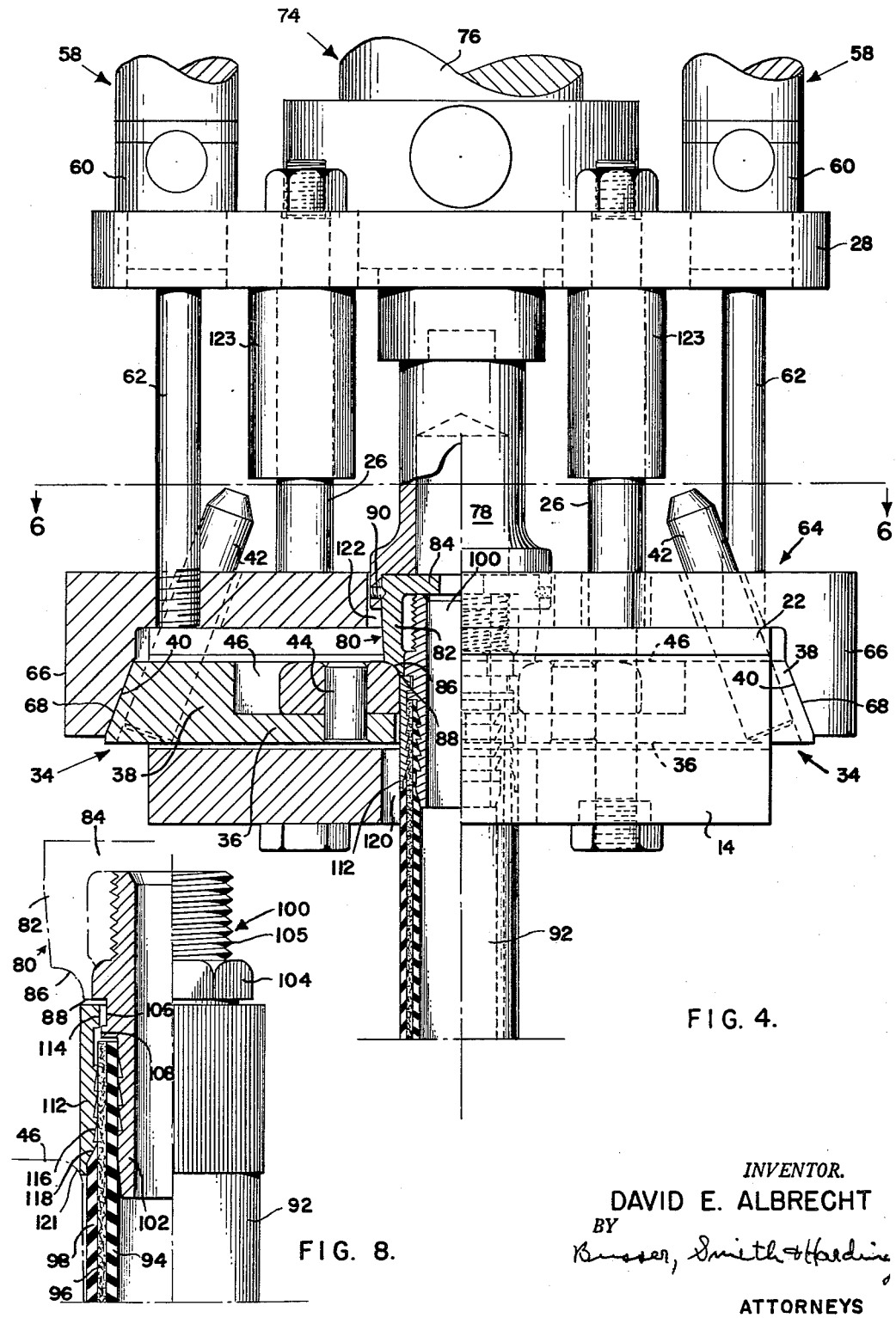

3,047,043
APPARATUS FOR APPLYING HOSE COUPLINGS TO HOSES
David E. Albrecht, Philadelphia, Pa., assignor to Hose Accessories Co., Philadelphia, Pa., a corporation of Pennsylvania
Filed Nov. 18, 1959, Ser. No. 853,842
5 Claims. (Cl. 153—1)

This invention relates generally to apparatus for applying hose couplings to hoses and particularly to improvements in hydraulic presses for applying couplings to hoses on a commercial basis.

Known apparatus for commercially fitting hoses with shank type couplings have not proven to be entirely satisfactory because they require time consuming and cumbersome manipulation of both the work and the apparatus, in consequence of which production rates are unduly low. Accordingly, an important object of this invention is to provide apparatus which facilitates positioning the work for the assembling operation, automatically releases the work at the end of the assembling operation, and which can be readily rearranged to accommodate a change over from assembling one size to assembling a different size of coupling.

Other objects of the invention will become apparent from a reading of the description in conjunction with the drawings, in which:

FIGURE 4 is the same as FIGURE 3, part being shown in section, and the press being shown closed on the work;

FIGURE 8 is an elevation, half shown in section, showing the relative positions of the hose and coupling parts before they are pressed together to fully assemble the same.

Figure 6:
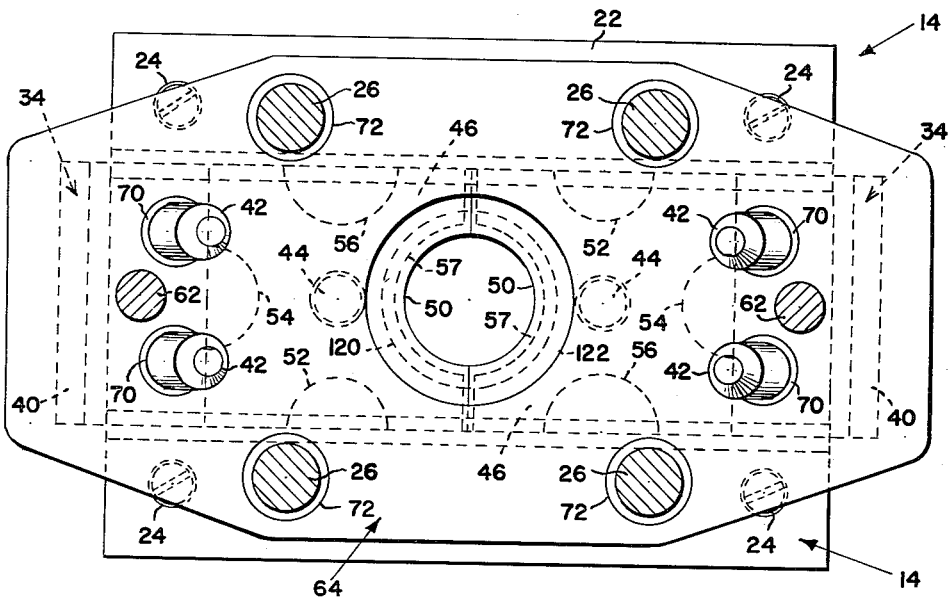
FIGURE 6 is a section on line 6—6 of FIGURE 4.
Figure 5:
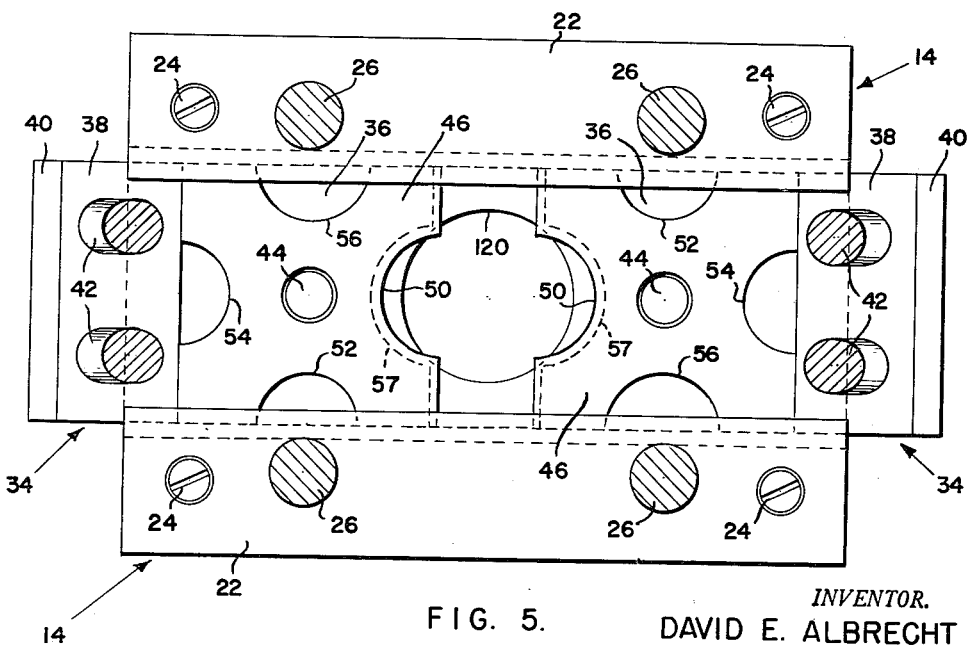
FIGURE 5 is a section on line 5—5 of FIGURE 3.

Referring to the drawings, an exemplary apparatus constructed in accordance with and embodying the principles of the present invention comprises a rigid base 10 provided with a sloping top 12, to which top there is fixed a frame comprising an elongated bed 14 having a base wall 16 and opposite side walls 18 and 20, the wall 18 being attached to the base 10 by suitable connecting means not illustrated. Seated upon the walls 18 and 20 respectively are a pair of plates 22 secured to the walls 18 and 20 by studs 24. Projecting through the plates 22 and the bed 14 are the lower end portions of a set of four standards 26, which standards extend from the bedplate 14 parallel to the sloping top 12 of the base 10 and mount a crossbar 28, which is also secured to the base 10. As most clearly shown in FIGURES 5 and 6, lining each of the walls 18 and 20 of the bed 14 are a pair of flat bar runners 30 respectively positioned adjacent the base wall 16 of the bed 14 and the associated plate 22. Lining the base wall 16 of the bed 14 are a pair of flat bar runners 32 disposed respectively adjacent the associated flat bar runners 30, and lining the undersurfaces of longitudinally extending marginal portions of the plates 22 respectively are a second pair of flat bar runners 32 disposed respectively adjacent the associated flat bar runners 30, thus there is formed a channel or guideway for accommodating a pair of die mounting carriages now to be described.

Each die carriage, generally designated 34, comprises a sole plate 36 having a thickened outer end portion 38. The outer end of the portion 38 is beveled to provide a cam face 40, and mounted upon the portion 38 are a pair of laterally spaced guide pins 42 tapered, as at 43. Mounted upon the sole plate 36 is a die centering pin 44 which has removably fitted thereover a female die member 46. The member 46 is generally square and the sides thereof are provided respectively with inwardly and downwardly slightly tapering semi-circular recesses 50, 52, 54 and 56, each of the latter having a different radius. The width and length of the member 46 each correspond to the width of the sole plate 36 and the side thereof opposite the thickened portion 38 of the carriage abuts the latter so that the die member cannot turn about the pin 44. The opposite side of the die overhangs the inner end of the sole plate 36, which is provided with a semi-circular recess 57. The upper surface of the die member 46 is coplanar with the upper surface of the thickened carriage portion 38. The carriages 34 and the die members 46 mounted thereon are slidably received in the guideway formed by the flat bar runners 30 and 32 and may be moved as desired toward or away from one another, the opposite ends of the way being open so that the carriage assemblies may be pulled out of the guideway altogether.

Figure 2:
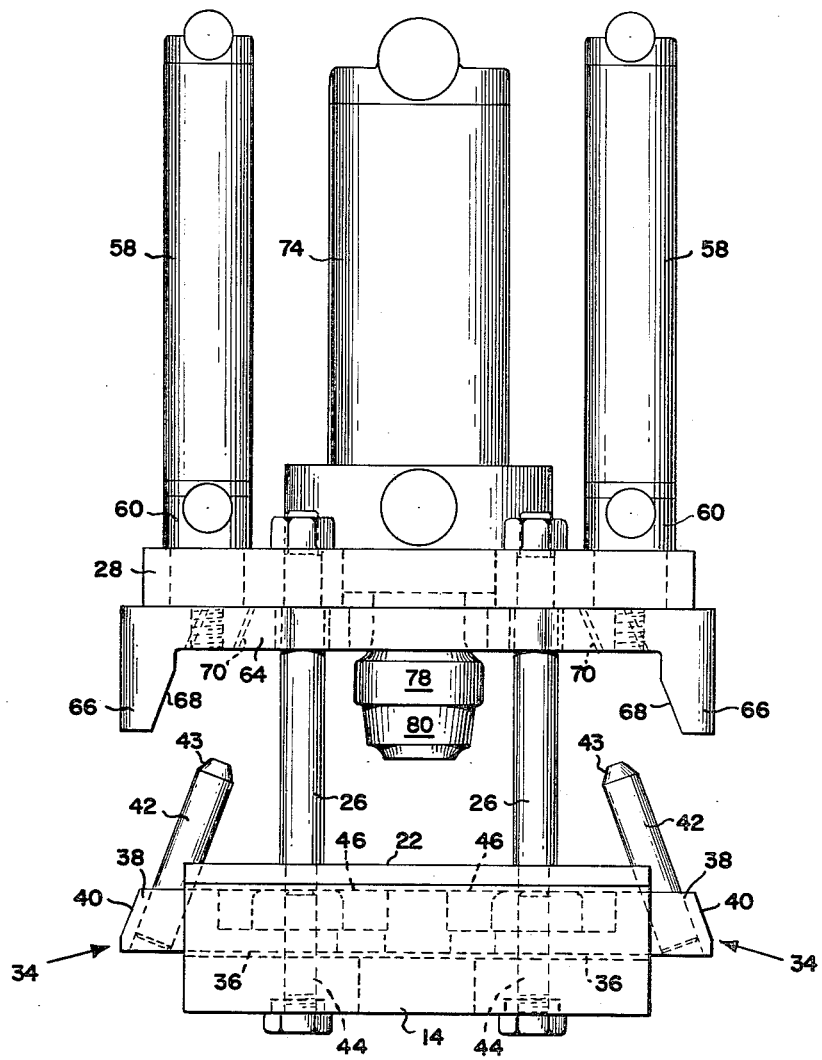
FIGURE 2 is a front view of the press, as indicated by line 2—2 of FIGURE 1.
Figure 3:
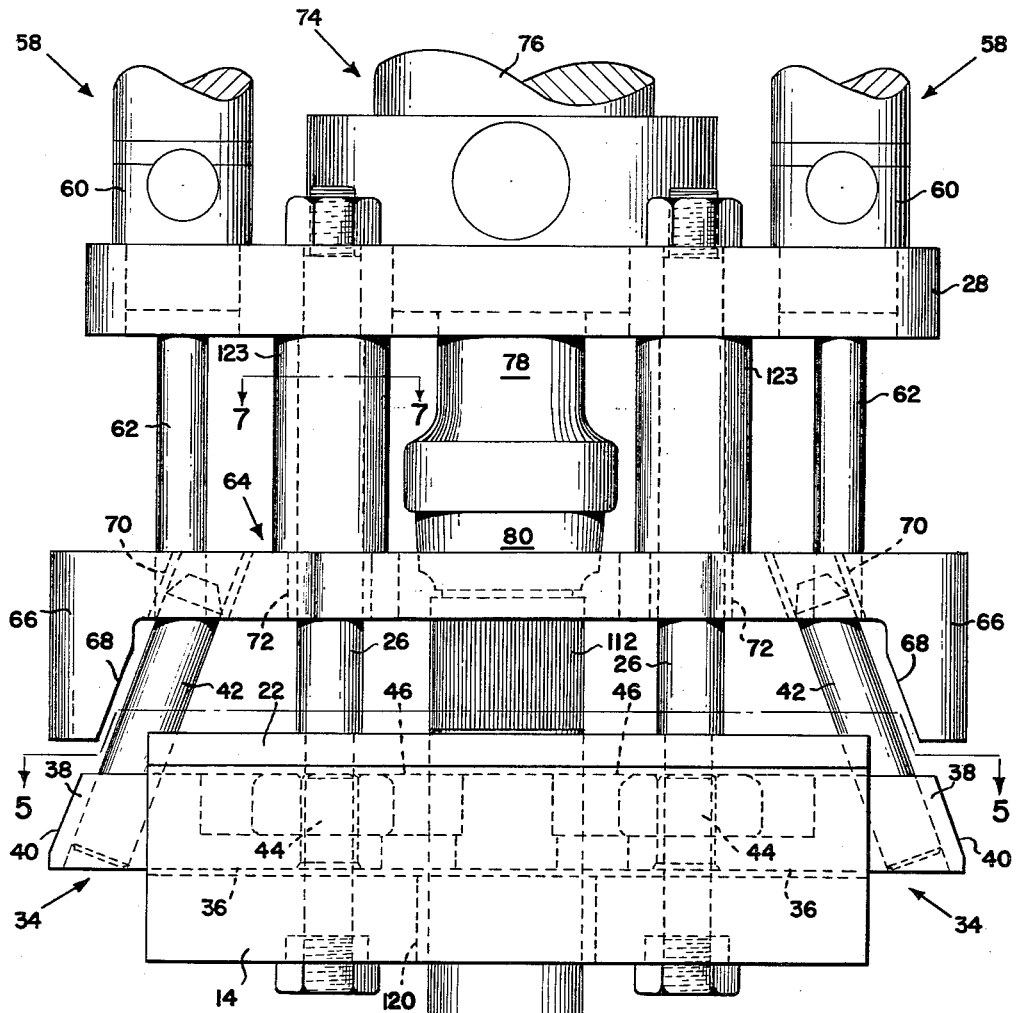
FIGURE 3 is the same as FIGURE 2, but is an enlarged fragmentary view showing the work in place and the assembling operation about to commence.
Figure 7:
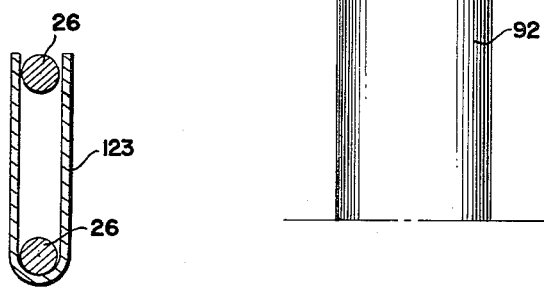
FIGURE 7 is a section on line 7—7 of FIGURE 3.

As most clearly shown in FIGURES 2–4, crossbar 28 mounts a pair of hydraulic motors 58, each comprising a cylinder 60 and a ram 62. The rams 62 have secured to the lower end portions thereof a crosshead 64 having depending opposite end portions 66. The inner face of each portion 66 is beveled to provide a cam face 68 which is parallel to the associated cam face 40 of the associated carriage 34. The crosshead 64 is fitted with four sleeve bushings 70 adapted for slidably receiving respectively the pins 42 and is also fitted with four sleeve bushings 72 respectively adapted for slidably receiving the standards 26. Also mounted upon the crosshead 64 is a hydraulic motor 74 including a cylinder 76 and a ram 78. Fitted into the lower end portion of the ram 78 is a male die member 80 having a hollow cylindrical wall 82 and an apertured upper end wall 84. Extending about the lower end portion of the wall 82 is an annular concave recess 86 and a circumferentially extending lower terminal edge 88. The member 80 is removably secured in the ram 78 by setscrews 90.

Figure 1:
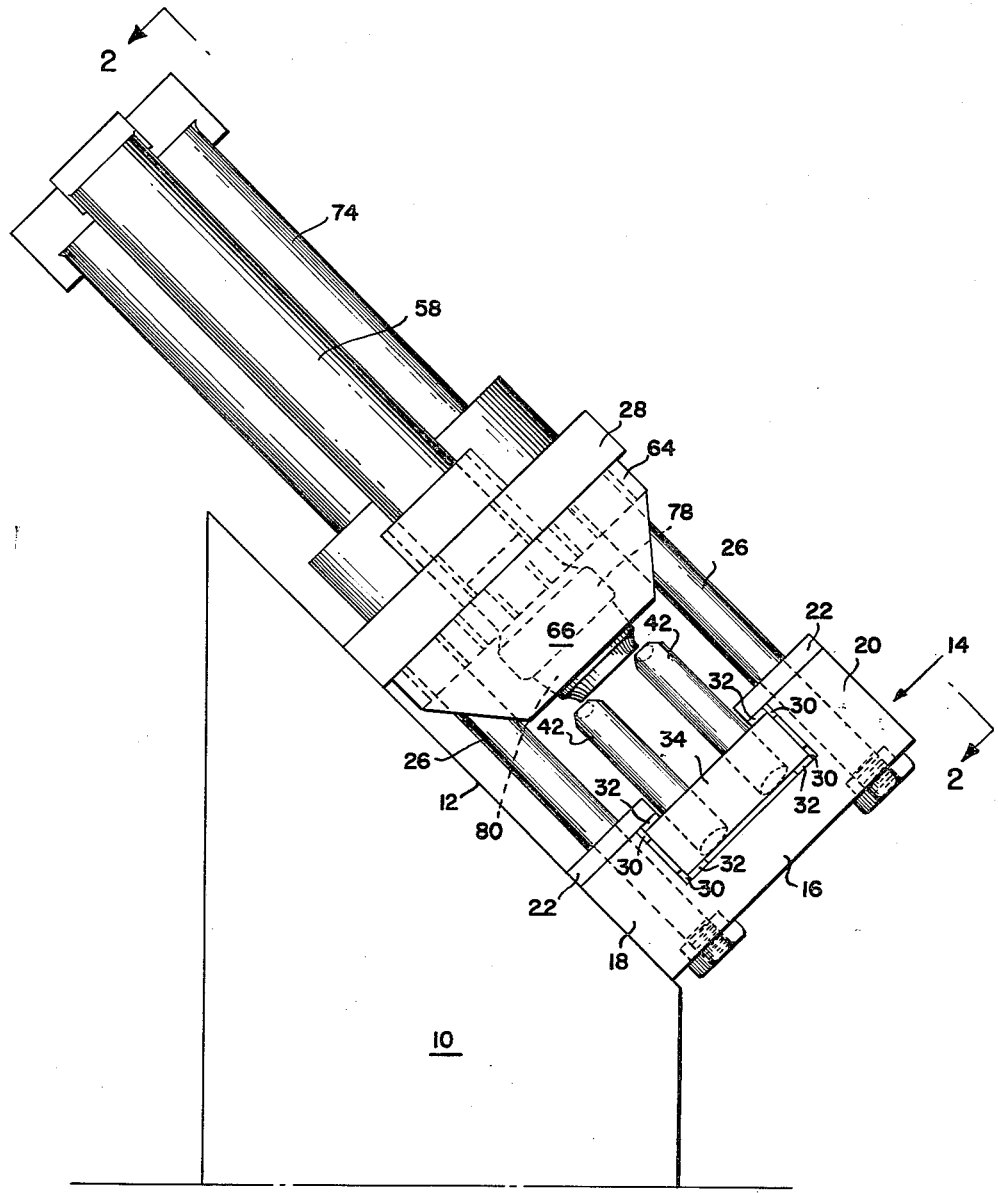
FIGURE 1 is a side view of an exemplary hydraulic press constructed in accordance with and embodying the principles of the present invention.

In the operation of the apparatus, prior to the first coupling and hose assembling operation, the rams 62 and 78 are retracted and the crosshead 64 and die member 80 are in fully raised position, as shown in FIGURES 1 and 2. The carriages 34 are manually pulled out of the guideways and the die members 46 are lifted off the centering pins 44 and then suitably oriented and replaced. Then the carriages 34 are reinserted in the guideway and left in widely spaced relation. Now the first work unit, in the preliminary stage of assembly now to be described, is positioned in the hydraulic press.

This work unit comprises a hose, generally designated 92, provided with an inner rubber lining 94, layers of braided wire armoring 96 and an outer rubber covering 98.

The hose coupling comprises a male part 100 having a shank part 102 and a formation 104 intermediate the externally threaded male end 105 and shank 102 adapted for receiving the head of a wrench. Immediately under the formation 104 is an external annular groove 106 and a circumferentially extending flange 108.

The hose coupling also comprises a female part in the form of a sleeve 112 having at one end thereof a radially inwardly extending flange 114 and integrally provided with corrugations 116 which terminates in a beveled edge 118.

Referring to FIGURE 8, the hose and coupling parts are shown in the preliminary stage of assembly aforesaid. The sleeve 112 has been slipped over one end portion of the hose, which end portion has beeen stripped of its outer rubber covering. It will be noted that the lower terminal portion of the sleeve 112 fits over the outer rubber covering 98 of the hose and that the bevel 118 abuts the complementally beveled edge of the outer covering. It will also be noted that the upper end of the sleeve 112 extends beyond the end of the hose. The shank 102 of the male coupling part is projected into the end of the hose, and the underside of the annular flange 108 is disposed a short distance from the end of the hose while the underside of the formation 104 is disposed a short distance from the end of the sleeve 112, in consequence of which the flange 114 of the sleeve 112 is not in registry with the groove 106 formed in the male coupling part immediately under the formation 104.

The partially assembled hose and coupling parts are positioned in the hydraulic press by inserting the same, coupling first, from the bottom through an opening, designated 120, formed in the base wall 16 of the bed 14. The coupling is raised above the die members 46.

Once the work unit has been positioned in the hydraulic press in the manner aforesaid, the rams 62 are extended to lower the crosshead 64 from the position thereof shown in FIGURE 2 to the position thereof shown in FIGURE 3. Simultaneously, the carriages 34 are manually shifted inwardly toward one another so that the upper ends of the pins 42 respectively enter the bushings 70, as shown in FIGURE 3. Upon further extension of the rams 62, the pins 42 enter farther into the bushings 70, and the carriages 34 are thereby cammed inwardly toward one another. By the time the undersurfaces of the depending portions 66 of the crosshead 64 are coplanar with the upper surfaces of the carriage portions 38, the cam surfaces 40 and 68 at each end of the apparatus are disposed in coplanar relation. Upon further extension of the rams 62, the aforesaid cam surfaces coact to cam the carriages toward one another until the opposed edges of the die members 46 abut one another, the hose 92 being embraced conjointly by the minimum diameter portions of semi-circular apertures 50 in die members 46.

Now the hose is pulled downwardly until the coupling rests upon the die members 46 with the lower terminal end of the sleeve 112 seated upon the marginal portion of the opening between the die members, rounded as at 121. As indicated in FIGURE 8, the outside diameter of the sleeve 112 is such that the sleeve cannot pass through the opening between the die members, and, therefore, the coupling extends above the die members 46.

Now the ram 78 is extended so that the apertured upper end wall of the die member 80 is brought to bear upon the circumferentially extending upper terminal surface of the coupling part 100. As indicated in FIGURE 8, the circumferentially extending lower terminal edge 88 of the die member 80 is coplanar with the undersurface of the formation 104 of the coupling part 100. Pressure is now brought to bear to fully assemble the hose and coupling parts. During initial movement of the die member 80 downwardly, the coupling part 100 is forced downwardly relative to the sleeve 112 until the underside of the formation 104 abuts the circumferentially extending upper terminal surface of the sleeve 112, at which time the flange 114 is in registry with the groove 106. Simultaneously, the circumferentially extending lower terminal edge 88 of the die member 80 engages the circumferentially extending upper terminal surface of the sleeve 112.

Upon further movement downwardly of the die member 80, pressure is applied thereby to both parts of the coupling, and the coupling is forced into the die members 46, in consequence of which the diameter of the sleeve 112 is progressively reduced to such an extent that the sleeve 112 is effective to clamp the hose between the sleeve 112 and the shank 102. At the same time, the flange 114 of the sleeve 112 is forced into interlocking engagement with the groove 106. The coupling is fully assembled with the hose when the die member 80 engages the die members 46.

It may be noted that die member 80 does not apply pressure at any time directly upon the formation 104 of the coupling part 100, in consequence of which in proportioning the formation 104 the operation of assembling the hose and coupling parts may be disregarded and the formation 104 made as small as desired. It has been found that by reducing the size of the formation 104 a very substantial amount of metal has been saved relative to the amount of metal required for forming this part in accordance with the teachings of the prior art. It may also be noted that in the finished product the outside diameter of the sleeve 112 and that of the hose are substantially the same, and that the maximum cross-axial size of the formation 104 of the coupling part 100 is substantially less than the external diameter of the sleeve 112.

It will be obvious that the ram 78 is operable independently of the rams 62, extending freely through an opening 122 formed in the crosshead 64.

The next step in the operation is withdrawal of the work from the press, which is accomplished merely by retracting the rams from the position thereof shown in FIGURE 4 to the position thereof shown in FIGURE 3. As the crosshead 64 rises, the carriages 34 are cammed outwardly in opposite directions through the medium of the pins 42 sliding in the bushings 70, in consequence of which the die members 46 are separated, releasing the coupling, which may be pulled downwardly through the opening 120 in the bedplate.

Stop plates, designated 123, are employed to limit movement of the crosshead 64 upwardly. These stops are fitted in place about the standards 26 after the crosshead 64 has been lowered from its fully raised position, preparatory to assembling the first unit of work. The crosshead 64 is not fully raised again until it becomes necessary to reorient the die members 46 in order to accommodate a different size of coupling. In this event the stops 123 are removed, the crosshead 64 fully raised to release the pins 42, the die carriages are removed from the guideway and the dies reoriented as required. It will be understood, of course, that when the die members 46 are reoriented, the die member 80 is removed and replaced with another of suitable size.

It may be noted that it is never necessary to thread the hose 92 through the top of the apparatus downwardly through the apparatus in order to position the coupling in the press. The coupling is positioned in the press by inserting it upwardly through the opening 120 in the bedplate. It will be noted that the coupling is automatically released from the press when it has been fully assembled. In view of the foregoing, it will be appreciated that the rate of production of the apparatus is comparatively high.

It will be understood, of course, that the present invention is susceptible of various changes and modifications which may be made from time to time without departing from the real spirit or general principles of the present invention, and accordingly it is intended to claim the same broadly as well as specifically, as indicated in the appended claims.

What is claimed is:

1. A machine for automatically securing a conduit in a fixed position, applying a coupling thereto and thereafter releasing said conduit comprising; a plurality of combination die and conduit securing members, means for limiting the movement of said members to radial motion in a single plane transverse to the longitudinal axis of said conduit, double acting cam means for alternatively moving said members toward and away from said conduit between radially innermost and outermost positions fixed by said cam means for alternatively securing and releasing said conduit, means for forcing said coupling at least partially through said members when said members are in said radially innermost position for contracting said coupling about end one of said conduit, and means for disengaging said cam means to permit movement of said members radially outward of said outermost position.

2. A machine for automatically securing a conduit in a fixed position, applying a coupling thereto and thereafter releasing said conduit comprising; a plurality of variable sized combination die and conduit securing members, means for limiting the movement of said members to radial motion in a single plane transverse to the longitudinal axis of said conduit, double acting cam means for alternatively moving said members toward and away from said conduit between radially innermost and outermost positions fixed by said cam means for alternatively securing and releasing said conduit, means for forcing said coupling at least partially through said members when said members are in said radially innermost position for contracting said coupling about one end of said conduit, and means for disengaging said cam means to permit movement of said members radially outward of said outermost position for changing said variable sized members.

3. A machine for automatically securing a conduit in a fixed position, applying a coupling thereto and thereafter releasing said conduit comprising; a plurality of die and conduit securing members, each of said members having at least one tapered, partly circular recess in the periphery thereof, said members being orientated relative to each other such that, upon movement of said members toward each other, said partly circular recesses jointly form a continuous aperture which decreases in diameter along the axis thereof, double acting cam means for moving said members toward each other to an innermost position wherein said conduit is held by the minimum diametered portion of said aperture, means for forcing at least a portion of said coupling through said aperture for contracting said coupling about said conduit and rigidly securing said coupling to said conduit, said double acting cam means also being operative to move said members away from each other to an outermost position fixed by said cam means, and means for disengaging said cam means to permit movement of said members outwardly of said outermost fixed position for changing said members.

4. A machine for automaticaly securing a conduit in a fixed position, applying a coupling thereto and thereafter releasing said conduit comprising; a plurality of combination die and conduit securing members, each of said members having a plurality of tapered and unequal size recesses in the periphery thereof, corresponding recesses of each member being of equal size thereby defining a plurality of sets of equal sized recesses, guide means for receiving said members and guiding said members for motion toward and away from each other between an expanded position and a contracted position, one of said sets of recesses forming a tapered aperture engaging said conduit when said members are in said contracted position, means for forcing at least a portion of said coupling through said aperture for contracting said coupling about said conduit, double acting cam means for moving said members to and from said contracted and expanded positions and holding said members in said positions between repetitive movements thereof, and means for disengaging said cam means for allowing movement of said members away from each other beyond said expanded position for reorientating said members to form apertures of various sizes.

5. The machine as claimed in claim 4 further including secondary cam means for assisting said double acting cam means in moving said members to said contracted position and holding said members in said contracted position during operation of said coupling forcing means.

References Cited in the file of this patent

UNITED STATES PATENTS

| | | |
|---|---|---|
| 1,917,743 | Walker | July 11, 1933 |
| 2,054,362 | Cowles | Sept. 15, 1936 |
| 2,060,860 | Flynt | Nov. 17, 1936 |
| 2,086,703 | Eastman | July 13, 1937 |
| 2,101,888 | Ambrosius | Dec. 14, 1937 |
| 2,258,919 | Wallace | Oct. 14, 1941 |
| 2,337,366 | Beck | Dec. 21, 1943 |
| 2,438,999 | Hartley et al. | Apr. 6, 1948 |
| 2,543,480 | Vaill | Feb. 27, 1951 |
| 2,622,652 | Conroy et al. | Dec. 23, 1952 |
| 2,676,391 | Elder | Apr. 27, 1954 |

UNITED STATES PATENT OFFICE
CERTIFICATE OF CORRECTION

July 31, 1962

Patent No. 3,047,043

David E. Albrecht

It is hereby certified that error appears in the above numbered patent requiring correction and that the said Letters Patent should read as corrected below.

Column 5, line 2, for "end one" read -- one end --.

Signed and sealed this 14th day of September 1965.

(SEAL)

Attest:

ERNEST W. SWIDER
Attesting Officer

EDWARD J. BRENNER
Commissioner of Patents